Oct. 11, 1938.  A. W. LE FEVRE  2,133,103
AUTOMOBILE HEATER
Filed Feb. 1, 1936
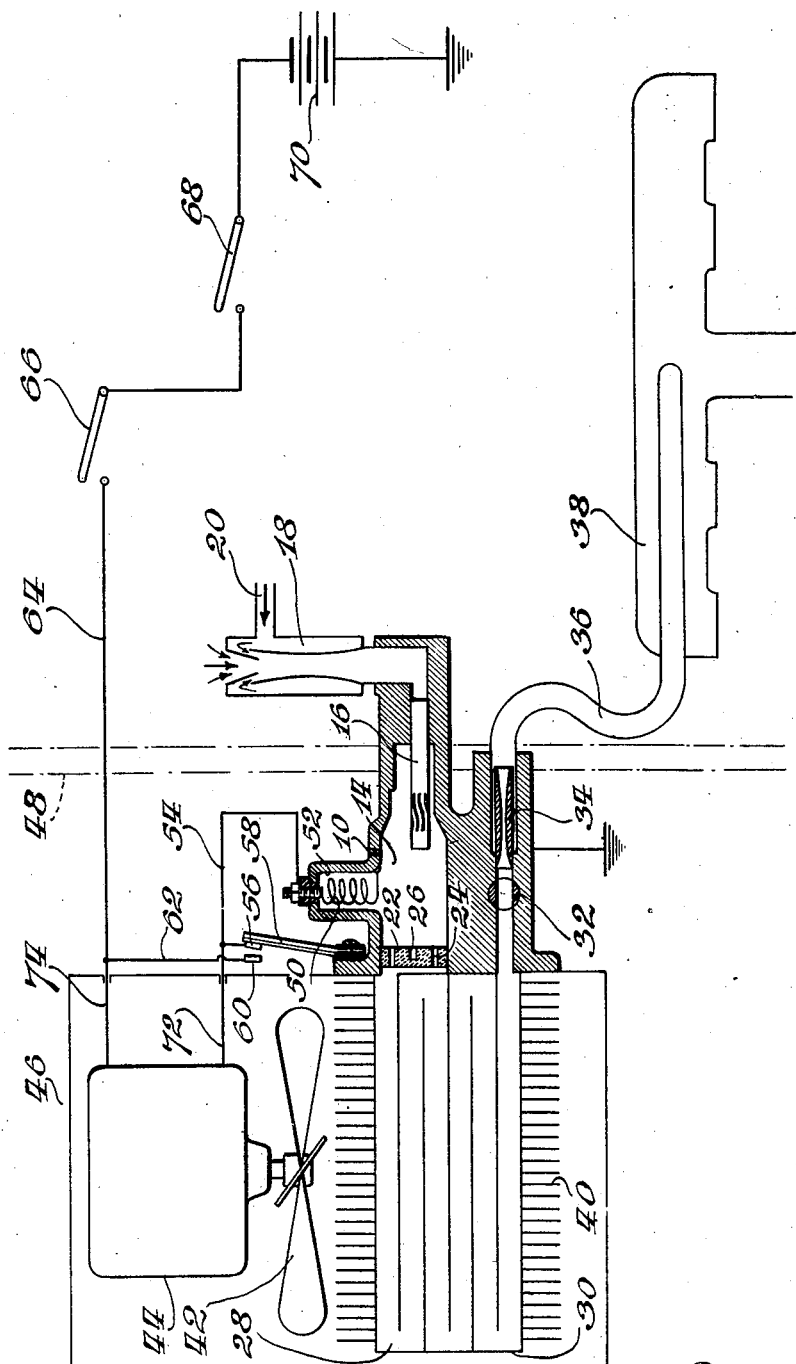
Inventor
Arden W. LeFevre
By Williams, Bradbury, McCaleb & Hinkle
Attys.

Patented Oct. 11, 1938

2,133,103

UNITED STATES PATENT OFFICE 2,133,103

AUTOMOBILE HEATER

Arden W. Le Fevre, Chicago, Ill., assignor to Stewart-Warner Corporation, Chicago, Ill., a corporation of Virginia Application February 1, 1936, Serial No. 61,934

5 Claims. (Cl. 126—110)

My invention relates generally to automobile heaters, and more particularly to means for controlling the operation of heaters used to heat the passenger compartments of automotive vehicles.

It is an object of my invention to provide an improved means to control the operation of heaters whereby the circulation of air past the radiator of the heater is prevented until the radiator has attained a predetermined temperature.

A further object is to provide an electrical circuit for the automobile heaters of the internal combustion type, using an electrical igniter, with means for automatically connecting the fan motor in series with the igniter when the heater is operating normally.

Other objects will appear from the following description, reference being had to the accompanying drawing, in which the heater and the electrical control circuit therefor are diagrammatically illustrated.

The heater comprises a body 10 having a combustion chamber 14 formed therein, a mixture of liquid fuel and air being supplied to the combustion chamber through a tube 16 from a carburetor 18 which is connected by a pipe 20 to a suitable liquid fuel supply, such, for example, as the float bowl of the engine carburetor. One wall of the combustion chamber 14 is formed by a re-igniter plug 22 made of a slightly porous refractory material having passageways 24 extending therethrough and having a recess 26 to aid in re-ignition of the mixture of combustible fuel and air in the chamber 14. Gases of combustion flowing through the passageways 24 of the re-igniter plug 22 flow through a circuitous passageway 28 formed in a radiator shell 30 and are drawn from this passageway past a shut-off valve 32 through a compensator 34 and tube 36 into the intake manifold 38 of the automobile engine. The radiator shell 30 is provided with a plurality of heat radiating fins 40 secured thereto in heat conducting relationship, and air from the passenger compartment of the vehicle is forced downwardly past the radiating fins 40 by a fan 42 driven by an electric motor 44.

The motor, fan and radiator are preferably mounted in a suitable casing 46 which is suitably secured to the dashboard or wall 48 which separates the passenger compartment of the automobile from the engine.

The heater thus far described is more fully disclosed in the copending application of Henry J. De N. McCollum, Serial No. 61,213, filed January 28, 1936, and forms no part of my present invention except in combination with the electrical control circuits hereinafter described.

The mixture of liquid fuel and air contained in the combustion chamber 14 is initially ignited by means of an igniter 50 positioned in a recess 52 at the side of and in communication with the combustion chamber 14, this igniter being in the form of a helical coil of nichrome high resistance wire, one end of which is grounded to the body 10 and the other end of which is insulated from the body and is connected to a conductor 54. The conductor 54 leads to a contact point 56 carried by a bimetal thermostatic element 58 which is mounted in heat conducting relationship upon the body 10. When the body 10 is at atmospheric temperature or at any temperature below that attained during normal operation of the heater, the contact 56 will complete a circuit through a complementary contact 60, conductors 62 and 64, main switch 66, ignition switch 68, battery 70 to the ground and hence to the igniter 50, thus supplying the current necessary to heat the igniter to a sufficiently high temperature to cause ignition of the combustible mixture in the combustion chamber 14. When, however, the body 10 attains the temperature of its normal operation, the thermostatic switch 56, 58, 60 will be opened, thus breaking the shunt between conductors 54 and 64 which is provided by the conductor 62, and supplying current to the fan motor 44 through conductors 72 and 74 which are connected to the conductors 54 and 64 respectively.

If desired, the main switch 66 may be connected directly to the battery 70 instead of being connected thereto through the ignition switch 68, and the main switch and valve 32 are preferably mechanically interconnected so that closing of the main switch 66 will take place simultaneously with the opening of the valve 32 and vice versa.

Upon closing the main switch 66 and opening the valve 32, the vacuum present in the intake manifold of the automobile engine will be transmitted to the combustion chamber, compensation for fluctuations in the degree of intake manifold vacuum being made by the compensator nozzle 34. The sub-atmospheric pressure in the combustion chamber 14 will cause the flow of air and liquid fuel into and through the carburetor 18.

Upon starting the heater, the body 10 will of course be at a relatively low temperature and hence the thermostatic switch 56, 58, 60 will be closed. Thus current will be supplied to the igniter 50, which will rapidly heat to incandescence and ignite the fuel mixture. The gases of combustion will be drawn through the passageways and the re-igniter plug 22 through the passageway 28 in the radiator shell 30 and hence outwardly through the valve 32, compensator 34 and tube 36 to the intake manifold 38. The gases of combustion will give up the greater portion of their heat to the radiator shell 30 and the body casing 10. When the temperature of the latter attains that of normal operation of the heater, the thermostatically controlled switch 56, 58, 60 will open. With this thermostatically controlled switch open, the igniter 50 will be connected in series with the winding of the electric motor 44, and thus the amount of current passing through the igniter will be limited to an inconsequential amperage with unappreciable heating effect upon the igniter. Should the flame in the combustion chamber thereafter become extinguished, the re-igniter plug 22 will be effective immediately to re-ignite the flame to maintain combustion within the chamber 14.

In the event that the interruption in the supply of the combustible mixture to the combustion chamber is of such extended duration that the re-igniter plug is ineffective to re-ignite the mixture, the body 10 will be cooled rapidly with the result that the thermostat 58 will close the contacts 56, 60 and connect the igniter 50 directly to the battery, and short circuit the motor 44. The fan motor will thus stop while the charge in the combustion chamber is being re-ignited and while the temperature of the body is again being raised to its normal operating temperature.

The use of the thermostatically operated switch to control the operation of the motor fan is not confined to heaters of the internal combustion type herein illustrated, but may readily be applied to automobile heaters of the hot water, hot air and steam types. As at present used, heaters of these latter types are rendered operative by closing a switch completing the circuit to the fan motor. If the radiator is not at an effective heating temperature, the fan motor directs an uncomfortable blast of cold air against the occupants of the vehicle. With a thermostatic switch of my invention incorporated in the motor control circuit, such ineffective and undesirable operation of the fan motor will be prevented, and the motor will commence operation only when the radiator has attained a temperature sufficiently high to deliver heated air. When incorporating my invention in automobile heaters other than those of the internal combustion type, the thermostatic switch 56, 58, 60 will be located in series with the control switch 66 instead of in the circuit as described herein.

It will be understood by those skilled in the art that various modifications and changes may be made in the invention herein disclosed without departing from the basic principles thereof. I therefore desire to include within the scope of the accompanying claims all such modified forms by which substantially the result of my invention would be obtained in substantially the same way.

What I claim and desire to secure by Letters Patent is:

1. In a heater for automobiles, the combination of a combustion chamber, means to conduct a combustible fuel to said chamber, an electrically operated igniter in said chamber, a heat radiator receiving the products of combustion from said chamber, a fan for propelling air past said radiator, a motor for driving said fan, a thermostatic switch responsive to changes in temperature of said chamber and arranged to close when the temperature in said chamber falls below the temperature necessary to support combustion therein, a source of electric energy, means for connecting said source in series with said thermostatic switch and with said igniter, and a circuit bridging said switch for supplying current to said motor.

2. In a heater of the internal combustion type, the combination of an electrically operated igniter, a heat radiator, a fan for circulating air past said radiator, an electric motor for driving said fan, a source of electricity, and a thermostatically operated switch mounted in position to receive heat from said radiator and operable when heated to permit sufficient current from said source to flow through said motor to operate the same and when cooled substantially to prevent flow of current from said source to said motor and to connect said igniter directly to said source.

3. In a heater for automobiles, the combination of a liquid fuel burning device, an electrical igniter therefor, a radiator connected to receive the products of combustion from said device, an electric fan motor for circulating air past said radiator, the resistance of the windings of said motor being high relative to the resistance of said igniter, a thermostatic switch constructed and arranged to open when heated by said device, a source of electric current, a circuit including said thermostatic switch for connecting said source directly to said igniter, and a circuit including said motor and bridging said thermostatic switch, whereby when said device is cold said igniter will be connected by said switch directly to said source, and when said device is heated, due to normal operation thereof, said motor will be connected in series with said igniter and said source.

4. In an automobile heater, the combination of a combustion chamber, an electrically heated igniter in said chamber, a heat radiator connected to receive heated gases from said chamber, a fan for forcing air past said radiator, an electric motor for driving said fan, manually operated means for controlling the supply of electric current to said motor and to said igniter, and thermostatically operated means for rendering said manually operated means effective to supply operating current to said motor only when the temperature of said radiator exceeds a predetermined minimum value and to supply ignition current to said igniter alternately with said supply to said motor when the temperature of said radiator is less than a predetermined amount.

5. In a heat exchange device for automobiles, the combination of a radiator, electrically powered means for circulating air about said radiator in heat exchange relationship and having a predetermined electrical resistance, means for supplying heat to said radiator including an igniter having a much lower electrical resistance than said electrically powered means, means normally connecting said electrically powered means and said igniter in series whereby the resistance of the former substantially controls the current flow, and a thermostatic switch exposed to the temperature of said radiator for shunting said electrically powered means, whereby said electrically powered means is rendered ineffective and said igniter effective when the temperature of said radiator falls below a predetermined amount.

ARDEN W. LE FEVRE.